US008756667B2

(12) United States Patent  
Springfield et al.

(10) Patent No.: US 8,756,667 B2
(45) Date of Patent: Jun. 17, 2014

(54) MANAGEMENT OF HARDWARE PASSWORDS

(75) Inventors: Randall S. Springfield, Chapel Hill, NC (US); Jeffrey M. Estroff, Cary, NC (US); Seiichi Kawano, Kanagawa (JP); Mikio Hagiwara, Yamato (JP); David C. Challener, Raleigh, NC (US); James P. Hoff, Raleigh, NC (US); Binqiang Ma, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 749 days.

(21) Appl. No.: 12/341,512

(22) Filed: Dec. 22, 2008

(65) Prior Publication Data

US 2010/0162373 A1 Jun. 24, 2010

(51) Int. Cl.
*H04L 9/32* (2006.01)
(52) U.S. Cl.
USPC .................. 726/6; 726/4; 726/7; 713/186
(58) Field of Classification Search
USPC ........................ 726/4, 6, 7; 713/186
See application file for complete search history.

(56) References Cited

U.S. PATENT DOCUMENTS

| | | | | |
|---|---|---|---|---|
| 5,265,163 A | * | 11/1993 | Golding et al. | 726/19 |
| 7,124,195 B2 | * | 10/2006 | Roach et al. | 709/232 |
| 7,174,463 B2 | * | 2/2007 | Cromer et al. | 713/186 |
| 7,280,030 B1 | * | 10/2007 | Monaco | 340/5.21 |
| 7,568,108 B2 | * | 7/2009 | Monaco et al. | 713/182 |
| 7,624,279 B2 | * | 11/2009 | Davis et al. | 713/183 |
| 7,788,717 B2 | * | 8/2010 | Merkin | 726/18 |
| 7,895,443 B2 | * | 2/2011 | Grove et al. | 713/182 |
| 8,132,019 B2 | * | 3/2012 | Springfield et al. | 726/20 |
| 8,181,020 B2 | * | 5/2012 | Flynn | 713/164 |
| 2003/0101359 A1 | * | 5/2003 | Aschen et al. | 713/201 |
| 2004/0098585 A1 | * | 5/2004 | Grove et al. | 713/168 |
| 2006/0085625 A1 | * | 4/2006 | Cheston et al. | 713/1 |
| 2006/0143695 A1 | * | 6/2006 | Grynberg | 726/4 |
| 2007/0282757 A1 | * | 12/2007 | Pandya et al. | 705/76 |
| 2008/0077986 A1 | * | 3/2008 | Rivera et al. | 726/20 |

FOREIGN PATENT DOCUMENTS

| | | |
|---|---|---|
| CN | 1405686 A1 | 3/2003 |
| CN | 1466841 A1 | 1/2004 |
| CN | 1952857 A1 | 4/2007 |
| CN | 101404577 A1 | 4/2009 |
| DE | WO 2008 098710 | 8/2008 |

OTHER PUBLICATIONS

Technical Disclosure, www.ip.com, A Method of Central Managed Secure Client PC, Publication dated Jul. 12, 2006, IP.com No. IPCOM000138248D.

* cited by examiner

*Primary Examiner* — Mohammad A Siddiqi
(74) *Attorney, Agent, or Firm* — Ference & Associates LLC (57) ABSTRACT

In the context of computer systems, the generation of preboot passwords at a server instead of at a client. Preferably, preboot passwords generated at the server are distributed to the client, and a process is offered whereby a user can establish his/her own proxy, not known to the server, that can be used to release the stored passwords to the client hardware. Since the passwords are generated at the server, management of the passwords is greatly facilitated since they are generated at the site where they are stored. This also makes it easy to implement management features such as a group policy, since the password generation software will be able to make logical connections between users and hardware.

23 Claims, 7 Drawing Sheets

FIG. 7

MANAGEMENT OF HARDWARE PASSWORDS

FIELD OF THE INVENTION

The present invention relates generally to methods and arrangements for managing hardware passwords in a computer system.

BACKGROUND OF THE INVENTION

As is well known, passwords have long been employed by way of protecting computer systems from unauthorized access. Normally, a "hard disk password" (HDP) controls access to the hard disk drives or other storage devices of a computer. Generically, "pre-boot passwords" (PREPWD's) are passwords that can control access to the loading of an operating system at a computer; HDP's may thus be considered a subset of PREPWD's, along with other known types of pre-boot passwords such as what are known in the computer arts as "power-on passwords" (POP's) (generally used in powering on a computer system).

While the use of preboot passwords affords an extra level of security at a computer system, one of its main drawbacks is that they are not conducive to being centrally managed. Thus, while various computers at a location (such as a workplace environment) may each include a preboot password capability, since these are managed at the computer or client level and not at a higher level of hierarchy at the location, there is a great risk of losing valuable data and information. Particularly, if a user of a system is not available (e.g., through job termination, serious illness or death, etc.) to apprise others of the system's preboot password when he/she is unavailable, then it may become difficult if not impossible for others to gain access to important data or information housed at that system.

Accordingly, a growing and compelling need has been recognized in connection with affording a capability of more effectively managing preboot passwords to avoid the shortcomings just mentioned, as well as others.

SUMMARY OF THE INVENTION

Generally, there is broadly contemplated herein, in accordance with at least one presently preferred embodiment of the present invention, the generation of preboot passwords at a server instead of at a client. Preferably, preboot passwords generated at the server are distributed to the client, and a process is offered whereby a user can establish his/her own proxy, not known to the server, that can be used to release the stored passwords to the client hardware.

Since the passwords are generated at the server, management of the passwords is greatly facilitated since they are generated at the site where they are stored. This also makes it easy to implement management features such as a group policy, since the password generation software will be able to make logical connections between users and hardware.

In summary, one aspect of the invention provides a method comprising: providing a main memory in communication with the physical computing device; providing a vault memory in communication with the physical computing device, the vault memory being secure with respect to the main memory; storing a preboot password at the vault memory; and responsive to user input, unlocking the vault memory to release the preboot password.

Another aspect of the invention provides an apparatus comprising: a physical computing device; a main memory in communication with the physical computing device; a vault memory in communication with the physical computing device, the vault memory being secure with respect to the main memory; a password management element which stores a preboot password at the vault memory; and an unlocking element which acts to unlock the vault memory responsive to user input to release the preboot password.

Furthermore, an additional aspect of the invention provides a program storage device readable by machine, tangibly embodying a program of instructions executable by the machine to perform a method comprising: providing a main memory in communication with the physical computing device; providing a vault memory in communication with the physical computing device, the vault memory being secure with respect to the main memory; storing a preboot password at the vault memory; and responsive to user input, unlocking the vault memory to release the preboot password.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 1:
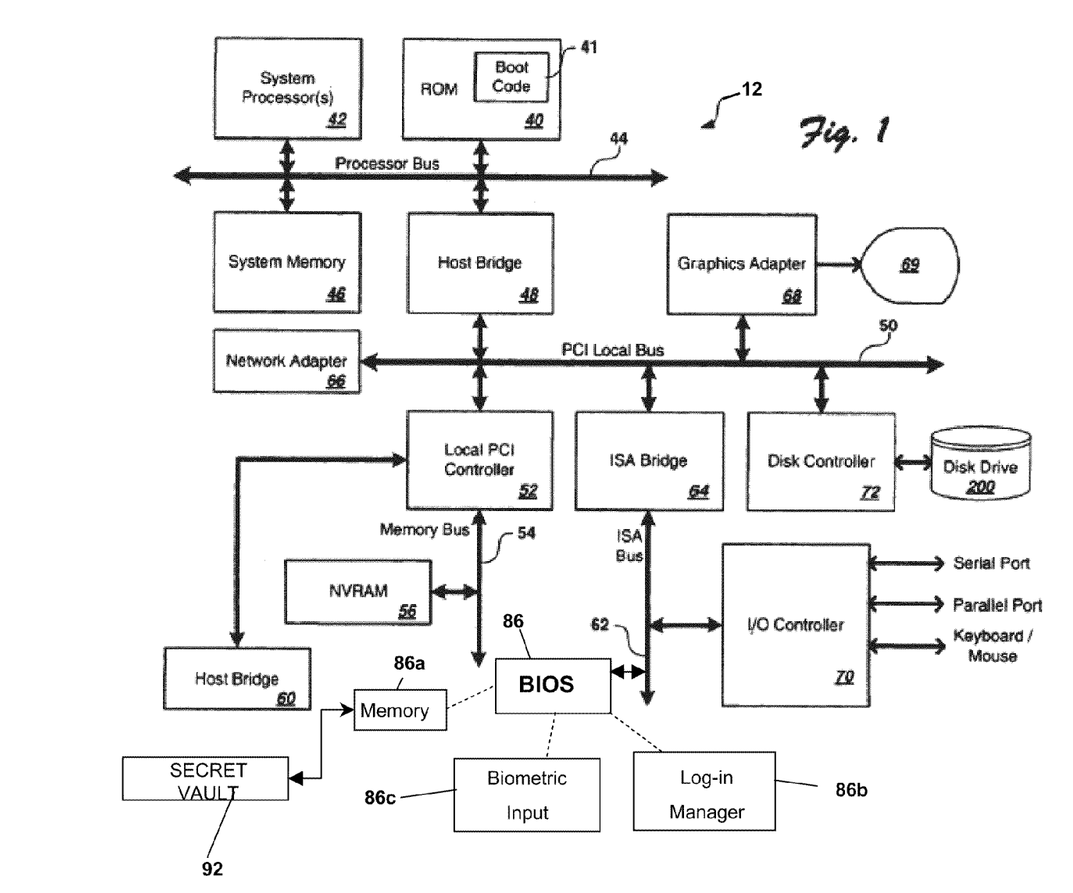
FIG. 1 schematically illustrates a computer system with added components.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Indicated at 86 is a BIOS (basic input/output system) whose functioning, in accordance with at least one presently preferred embodiment of the present invention, will be better understood from further discussion herebelow.

As is known conventionally, associated with BIOS 86 is a memory 86a (such as a flash memory), while in accordance with at least one preferred embodiment of the present invention further includes software logical architecture in the form of a login manager 86b. Login manager 86b preferably processes user logins of one or more types, and will be better understood from further discussion herebelow. Preferably also associated with BIOS 86 is additional software logical architecture in the form of a medium for biometric input 86c, which also will be better understood from further discussion herebelow; essentially, and by way of an illustrative an non-restrictive example, this could include a fingerprint reader (i.e., the software that processes a fingerprint image that itself has been fed to the reader 86c by a separate element attached to or otherwise in operative or functional communication with the machine encompassing system 12).

Also shown is a secret vault 92, the purpose and function of which will be better understood from further discussion herebelow. Essentially, secret vault 92 is a protected section of memory for storing a preboot password and/or data or information relating to a preboot password and can only be unlocked to release such a password or information or data responsive to a predetermined authentication protocol. Preferably, secret vault 92 is directly functionally integrated with BIOS 86, e.g., via residing in or otherwise being functionally connected with the BIOS memory 86a.

Further, it should be understood that an arrangement for processing fingerprints could alternatively be configured for processing other types of user-based biometric input (e.g., an iris reader, voice recognition, face recognition); even a smart card reader could be employed here to identify a user. As such, it should be understood that there is broadly contemplated herein, in accordance with at least one embodiment of the present invention, a very wide variety of conceivable biometric or non-biometric modes of user input that need not be restricted to those specifically addressed herein.

Fingerprint reader 86c (as an example of biometric input 86c from FIG. 1) will preferably accept data relating to a user's fingerprint image. Though a very wide variety of fingerprint readers could be used in accordance with embodiments of the present invention, an illustrative example could involve fingerprint readers as produced by UPEK, Inc., of Emeryville, Calif. (reference may be made to www.touchchip.com ).

It should be readily understood that FIG. 1 illustrates a computer system 12 that itself can be considered an illustrative example of a "client" system as broadly defined herein in the context of a server-client relationship. Of course, other types of client systems can easily be employed within the context of one or more embodiments of the present invention.

Turning now to a more detailed discussion of embodiments of the present invention, reference is made herethroughout to a "centralized managed password", or CMP. As broadly discussed and contemplated herethroughout, a CMP permits a user to type in a universal password for his/her use that has the ultimate effect of releasing, from a centralized location, any password or key that would be appropriate for allowing a user to access a specific system or system portion. In other words, rather than employ a multitude of passwords or keys to access a system or different system portions, a CMP can afford the use of what may be thought of as a "universal" password for a user, whereby this "universal" password serves to "release" whatever password(s), key(s) or other decryption element(s) may be needed to unlock, decrypt or permit access to the particular system or system portion to which a user is attempting to gain access. Since the "centralized location" may be a server, with the local location (where a user is logging in) being a client of the server, it can thus be appreciated that a CMP permits a server to control access to a client of the server, such that it would be easy (if needed) to revoke access to the client. Some helpful background information on CMP login may be found in the publication, "A Method of Secure Managed Secure Client PC," at the IP.com Prior Art Database (www.ip.com), IP.com number IPCOM000138248D; this publication is hereby fully incorporated by reference as if set forth in its entirety herein.

Figure 2:
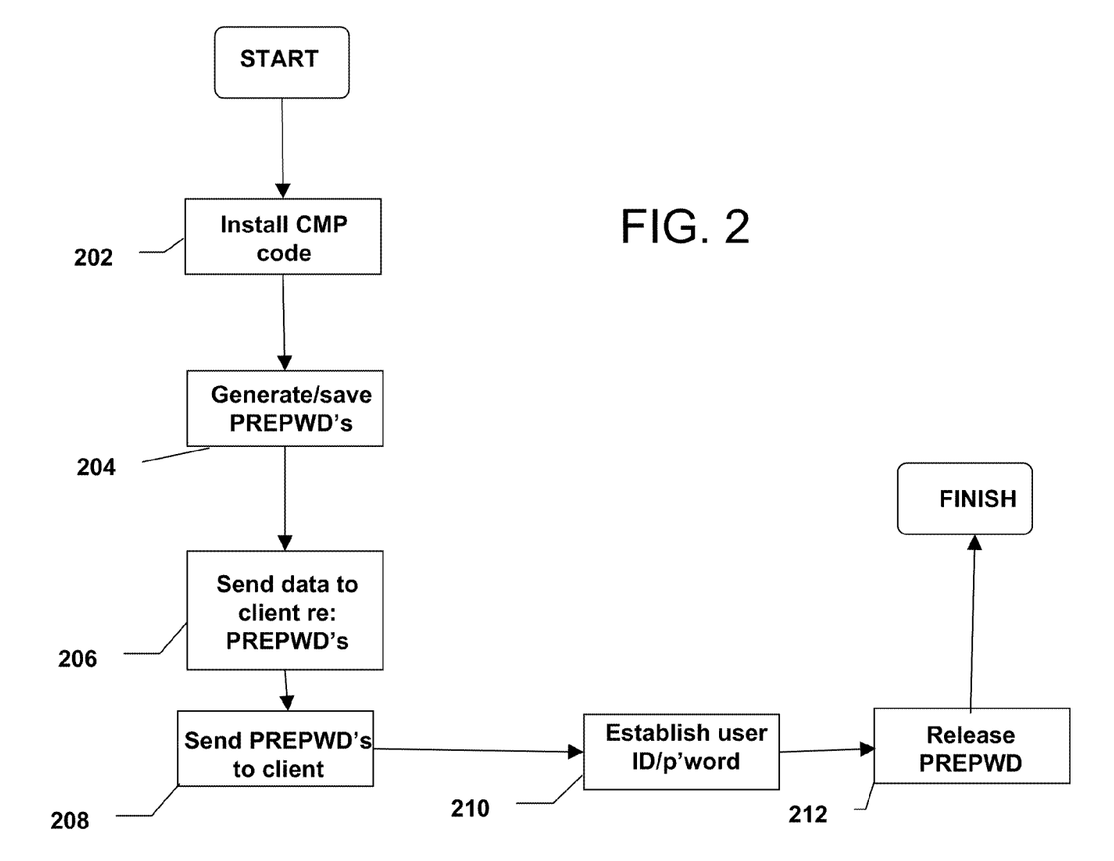
FIG. 2 schematically illustrates a process for installing and managing preboot passwords.

FIG. 2 schematically illustrates a general process that may preferably be carried out in accordance with at least one presently preferred embodiment of the present invention:

Client code relating to the management of a CMP is installed at the client (202). This installed code will thenceforth act to save a secret code or other secret element at the client, e.g., at the secret vault 92 (see FIG. 1), and this secret code or secret element is configured for permitting the user to communicate with a server.

At the server end, preboot passwords (or PREPWD's) are generated and are saved for future use (204). Preferably, a PREPWD will include random characters and be of a length such that compromising its value (by an unauthorized source) will be non-trivial.

Thence (206), the server preferably sends data related to preboot passwords to the client, through any security arrangement (e.g., firewall) that protects the client OS (operating system). This data can be grouped or categorized in essentially any of a very wide variety of manners, and exemplary categories or "instances" are discussed more fully herebelow with reference to FIGS. 3-7. Next (208), by making use of the installed code and secret element (mentioned above), an actual preboot password is sent from the server to the client.

At the client, the user is then preferably prompted to establish his/her own User ID and password, this password of course being distinct from the preboot password generated at the server (210). Thenceforth (212), the BIOS 86*a* (FIG. 1) will preferably employ (via login manager 86*a*) the user's User ID/Password locally as a proxy to release the preboot password (or PREPWD) as stored in secret vault 92 (FIG. 1).

Optionally, and in a manner to be more fully appreciated herebelow, when a user installs on a new computer, the server can assign generated preboot passwords to a group of users. For instance, the server can permit a group of Active Directory ID's access to a particular client. In this setting, a user would employ his/her own active directory login to access a system. The server would then recognize that the system is assigned to a group; accordingly, to then determine if the user has access rights, the server preferably verifies that the user is part of the group which has access rights, whereupon the server would release the actual hardware passwords. This transaction would be secured because the server/client would exchange key material (e.g., secret elements) during the install so that the data would be secured.

Figure 3:
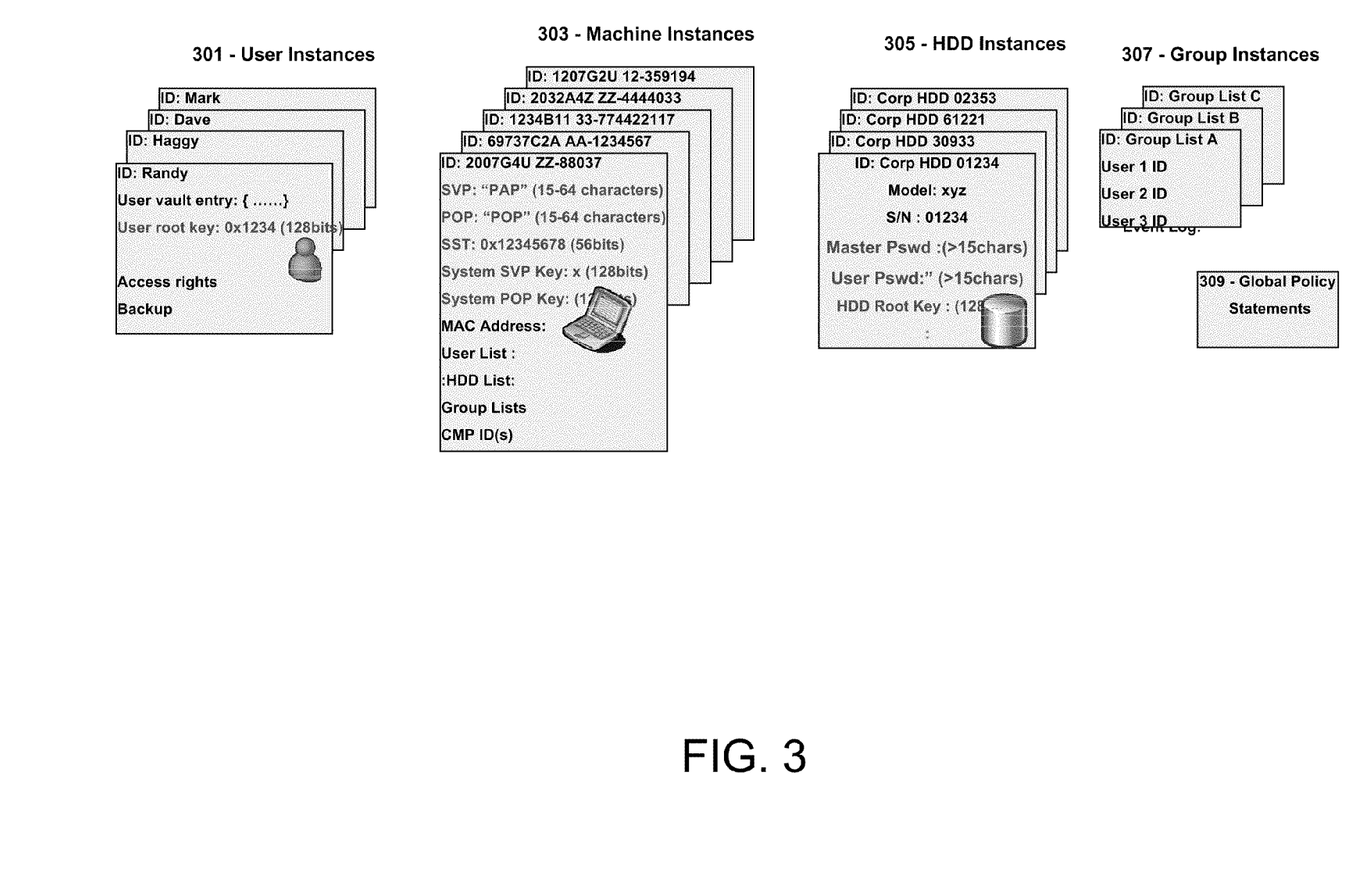
FIG. 3 schematically depicts logical groupings that can be used in the management of preboot passwords.

FIG. 3 schematically depicts, by way of an illustrative and non-restrictive example, logical groupings for how a server could combine entries. Final groupings and relationships will of course be up to the server application, but at the very least FIG. 3 provides a general idea of the great variety of implementations that may be employed for making use of a server-managed preboot password as broadly contemplated herein.

Accordingly, by way of an illustrative and non-restrictive example, indicated at 301 are data grouped in accordance with user instances, or user-based implementations of preboot password management as broadly contemplated herein. Similarly, indicated at 303 are data grouped in accordance with machine or computer system instances. The other examples shown in FIG. 3 are data grouped in accordance with hard disk drive (HDD) instances 305 and group instances 307 (e.g., where several users belong to a predetermined group that as a whole is accorded certain rights in the context of a server and/or one or more client systems). Generally, grouping in accordance with HDD instances can be useful in that HDD's indeed can be logically separated from a system. As such, if it cannot readily be determined as to which system a HDD might belong to, an HDD can still be unlocked with its own password distinct from a system password.

Finally, indicated at 309 are global policy statements that may be employed by the server in order to manage access to preboot passwords via criteria that may be more general than those implied by the type of categorization associated with the instances 301-307.

Generally, any and all data associated with instances or policies such as those illustrated in exemplary fashion in FIG. 3 at 301-309, may preferably be stored at a server. Generally, and as will be more fully appreciated herebelow, data in red FIG. 3 are preferably generated by the server, stored in the secret vault (92 in FIG. 1) and possibly system hardware; such data are preferably used to unlock preboot passwords and may also be stored at the server for recovery purposes (e.g., if a password is lost in some manner, the server can provide a backup).

Generally, it will be appreciated herein that preboot passwords such as a POP, SVP (supervisor password, to be discussed more fully below) and HDD password can be stored at different places in a computer system while, in accordance with at least one presently preferred embodiment of the present invention, a secret vault will also have such passwords stored and encrypted. When a correct credential is then input by the user, which could include, but by no means be limited to, a local password, a CMP or biometric input, one or more pre-boot passwords in the secret vault is/are released and then compared to those stored elsewhere (e.g., a POP and/or SVP as may be stored in general BIOS memory or an HDD password as may be stored in system hardware).

Figure 4:
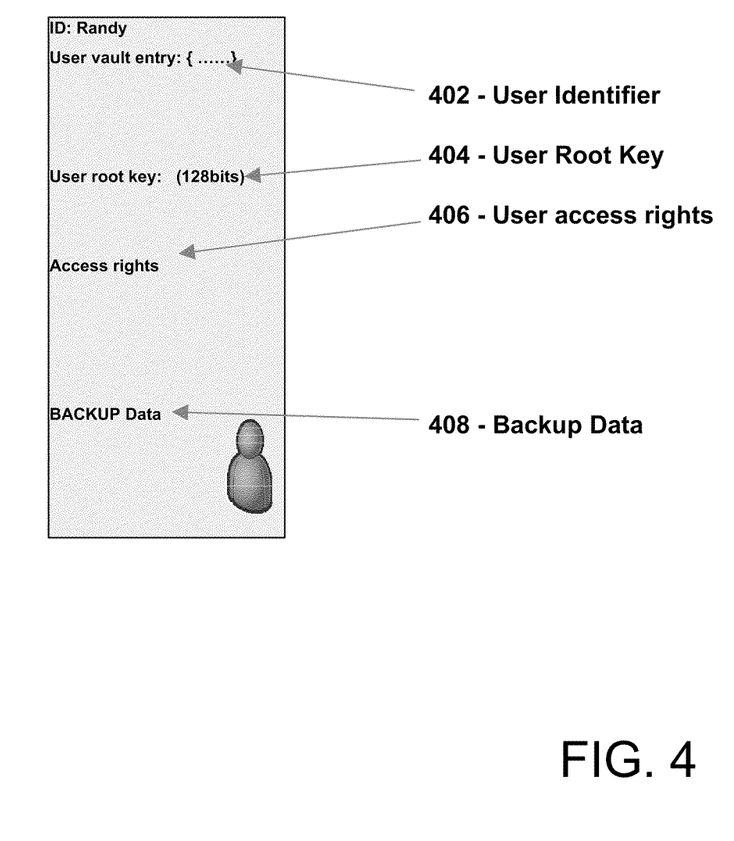
FIG. 4 schematically illustrates user-based data grouping.

FIG. 4 schematically illustrates user-based data grouping. Here, preferably, there will be an entry for each user that has signed on to a given CMP. Each entry preferably includes a user identifier 402, a root key 404, an indication of user access rights 406 and backup data 408. Preferably, root key 404 is used to decrypt a secret vault such as that indicated at 92 in FIG. 1, and can essentially be embodied by any suitable key capable of such decrypting (e.g., a symmetric key). User access rights 406 can delineate for a particular user matters such as the passwords (e.g. preboot passwords or hard disk passwords) to which a user may have access, data for determining if a user has correct authorization to access system or to perform administrator functions, and/or an indicator as to whether a user is authorized to reset passwords on the system. Backup data 408 can include user information that can be stored for future redeployment.

Figure 5:
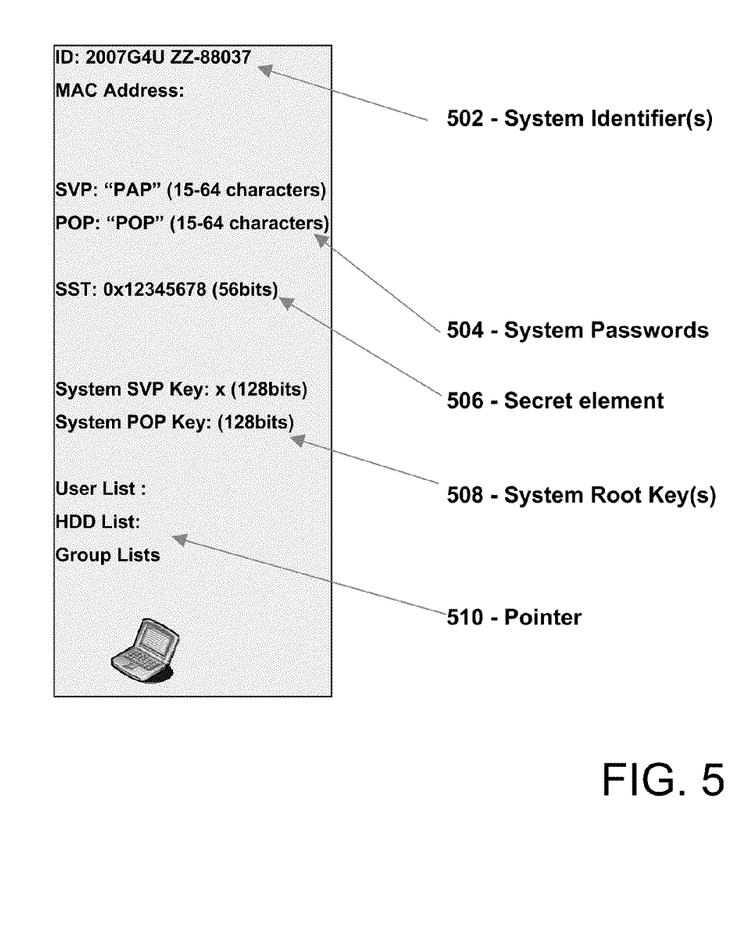
FIG. 5 schematically illustrates machine-based data grouping.

FIG. 5 schematically illustrates machine-based data grouping. Here, preferably, system identifier 502 could include information such as the manufacturer, product name and/or serial number of the system in question. By way of an illustrative and non-restrictive example, system passwords 504 can preferably include a SVP (supervisor password) and POP (or Power On Password) (the former being a password that permits administrator access to the system and the latter being a type of preboot password for fully powering on the system). Secret element 506, as discussed herethroughout, is preferably provided for establishing a secure session with a server.

Finally, pointer 510 can direct to additional data such as lists of hard disk drives configured for the system in question, a list of users who can log on to the system, and a list of groups that have rights to log on to the system.

Figure 6:
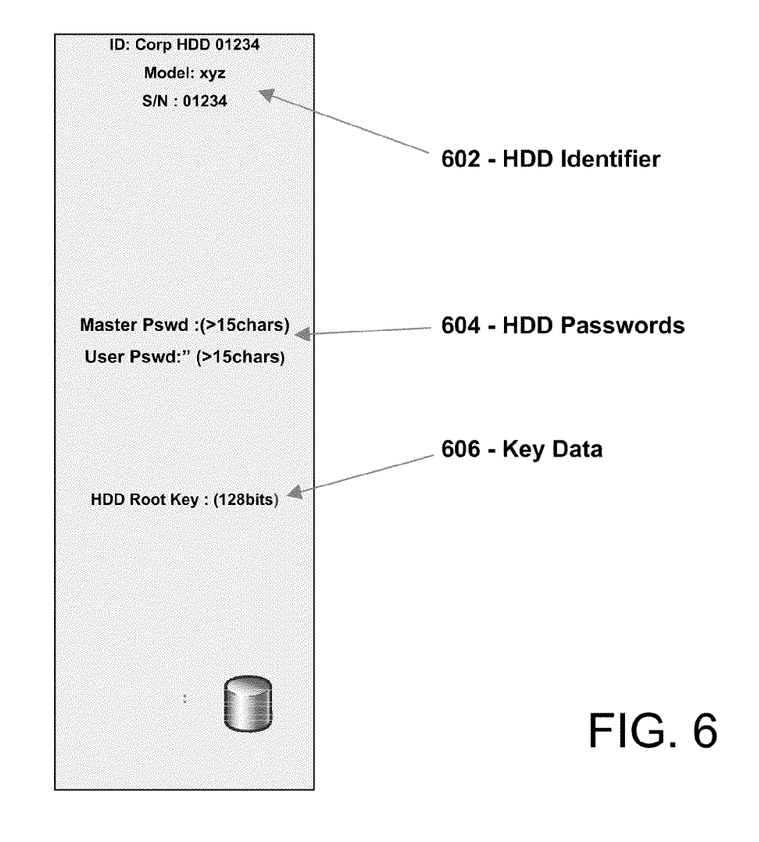
FIG. 6 schematically illustrates hard disk-drive based data grouping.

FIG. 6 schematically illustrates hard disk-drive based data grouping. An identifier 602 may preferably include such information as a serial number and/or model number of a hard disk drive. HDD passwords 604 may include a user hard disk password and a master hard disk password. (Usually, a user hard disk password is employed by an end user to unlock the drive. If this is forgotten or otherwise lost, then a master hard disk password, which is usually known by an administrator, can also be used to unlock the drive. In accordance with at least one embodiment of the present invention, since a user preferably will not know either of these passwords, the user hard disk password might be given out to an user if he/she is experiencing system problems, while a master hard disk password, which could well be common or widely used, might be used by a service technician. Finally, key data 606 can be essentially any suitable key for encrypting or decrypting hard disk passwords stored in the secret vault (e.g., 92 in FIG. 1).

Figure 7:
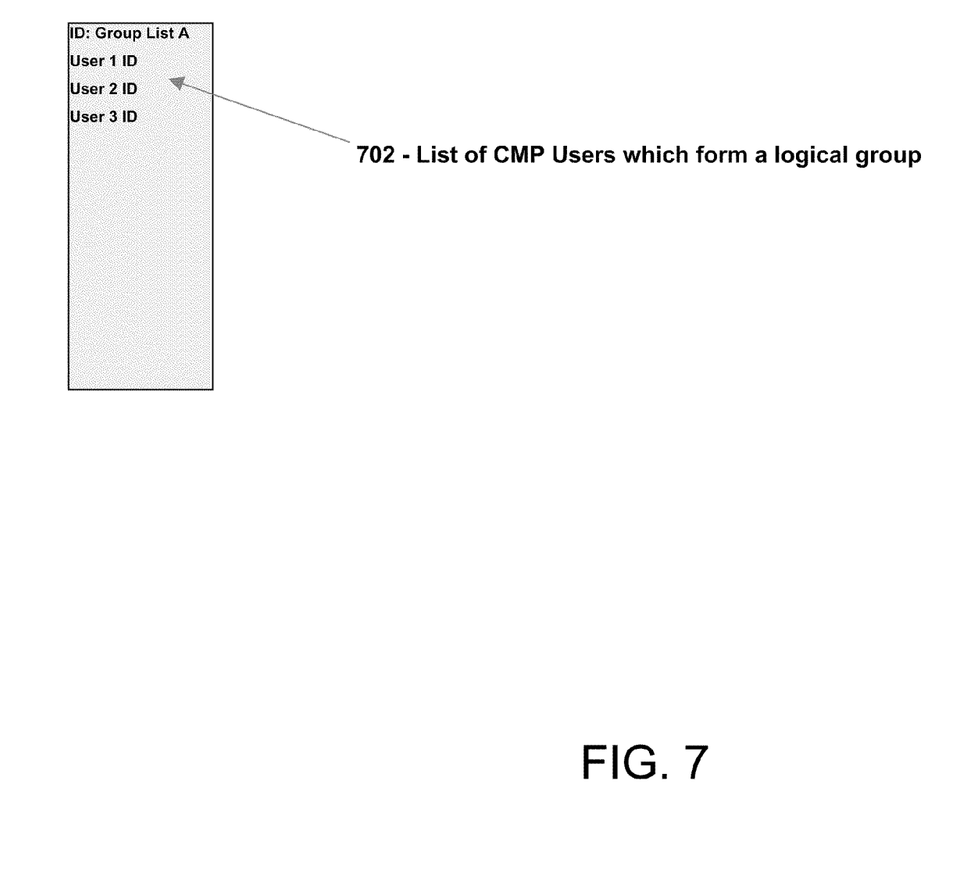
FIG. 7 schematically illustrates user group-based data grouping.

FIG. 7 schematically illustrates user group-based data grouping. Here, a list 702 of CMP users can preferably be provided by way of forming a logical group (e.g., a work group within a corporation or some other subset of authorized users within a larger cohort), and thus according members of that group a particular degree or level of access to one or more machines. This list, e.g., can be pointed to by pointer 510 in the machine instance illustrated in FIG. 5.

The group policy statements 309 shown in FIG. 3 preferably augment the instances 301-307 by way of establishing secret vault or hardware values or parameters during an initialization process (e.g., as in step _204 in FIG. 2). Such parameters could include, but of course are not limited to: a common master hard disk password which (if requested) can be deployed on each new system initialized, user logon password content (e.g., minimum length, expiration timeframe, password format) and user attributes (e.g., the type of unique User ID, if any, that may be required.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
providing a main memory in communication with a physical computing device;
providing a vault memory in communication with the physical computing device, the vault memory being secure with respect to the main memory;
receiving, at the physical computing device, one or more pre-boot passwords from one or more servers;
storing the one or more pre-boot passwords at the vault memory, the one or more pre-boot passwords being generated at the one or more servers, wherein the one or more pre-boot passwords are revocable by the one or more servers; and
responsive to user input received at the physical computing device, unlocking the vault memory to release the one or more pre-boot passwords.

2. The method according to claim 1, further comprising storing a communication element at the vault memory, the communication element facilitating communication with one or more external physical computing devices.

3. The method according to claim 2, wherein the communication element comprises a secure identifier which facilitates communication with the one or more external physical computing devices.

4. The method according to claim 2, wherein:
the physical computing device comprises a client computing device;
said storing of a communication element comprises storing a communication element which facilitates communication with the one or more servers.

5. The method according to claim 1, wherein said unlocking comprises unlocking the vault memory responsive to user authentication.

6. The method according to claim 5, wherein said user authentication is based on individual user credentials only.

7. The method according to claim 5, wherein said user authentication is based on authentication of a user as a member of a predetermined group of users.

8. The method according to claim 5, wherein said user authentication is based on authentication of a user at a pre-authorized machine.

9. The method according to claim 5, wherein said user authentication is based on authentication of a user in connection with a pre-authorized hard disk drive.

10. The method according to claim 5, wherein said user authentication comprises biometric authentication.

11. The method according to claim 10, wherein said biometric authentication comprises fingerprint authentication.

12. The method according to claim 5, wherein said user authentication comprises user password authentication.

13. The method according to claim 12, wherein said user password authentication employs a different password than a pre-boot password.

14. The method according to claim 1, wherein said providing of a vault memory comprises providing a vault memory in communication with basic input/output system (BIOS) memory.

15. The method according to claim 1, further comprising receiving data at the vault memory, the data corresponding to pre-authorization to release one or more pre-boot passwords on behalf of a predetermined group of users.

16. The method according to claim 1, further comprising receiving data at the vault memory, the data corresponding to pre-authorization to release one or more pre-boot passwords on behalf of a predetermined machine.

17. The method according to claim 1, further comprising receiving data at the vault memory, the data corresponding to pre-authorization to release one or more pre-boot passwords on behalf of a predetermined hard disk drive.

18. The method according to claim 1, further comprising receiving data at the vault memory, the data corresponding to pre-authorization to release a pre-boot password on behalf of a predetermined user.

19. An apparatus comprising:
a physical computing device;
a main memory in communication with the physical computing device;
a vault memory in communication with the physical computing device, the vault memory being secure with respect to the main memory;
a password management element which:
receives one or more pre-boot passwords from one or more servers;
stores the one or more pre-boot passwords at the vault memory, the one or more pre-boot passwords being generated at the one or more servers, wherein the one or more pre-boot passwords are revocable by the one or more servers; and
an unlocking element configured to unlock the vault memory responsive to user input received at the physical computing device to release the one or more pre-boot passwords.

20. The apparatus according to claim 19, wherein said password management element further acts to store a communication element at the vault memory, the communication element facilitating communication one or more external physical computing devices.

21. The apparatus according to Claim 20, further comprising:
a basic input/output system (BIOS) and a memory associated with said BIOS;
said vault memory being in communication with said BIOS memory.

22. The apparatus according to claim 19, wherein said physical computing device comprises a client computing device for communicating with a server and receiving a pre-boot password from the server.

23. A program storage device readable by machine, tangibly embodying a program of instructions executable by the machine to perform a acts comprising:
providing a main memory in communication with a physical computing device;
providing a vault memory in communication with the physical computing device, the vault memory being secure with respect to the main memory;
receiving, at the physical computing device, one or more pre-boot passwords from one or more servers
storing the one or more pre-boot passwords at the vault memory, the one or more pre-boot passwords being generated at the one or more servers, wherein the one or more pre-boot passwords are revocable by the one or more servers; and
responsive to user input received at the physical computing device, unlocking the vault memory to release the one or more pre-boot passwords.

\* \* \* \* \*